United States Patent
Du et al.

(10) Patent No.: US 12,155,083 B2
(45) Date of Patent: Nov. 26, 2024

(54) BATTERY MODULE

(71) Applicants: CALB Co., Ltd., Jiangsu (CN); CALB Technology Co., Ltd., Jiangsu (CN)

(72) Inventors: Xiaoyuan Du, Luoyang (CN); Keqiang Cheng, Changzhou (CN); Yong Cao, Changzhou (CN); Qixin Guo, Luoyang (CN)

(73) Assignees: CALB Co., Ltd., Jiangsu (CN); CALB Technology Co., Ltd., Jiangsu (CN)

( * ) Notice: Subject to any disclaimer, the term of this patent is extended or adjusted under 35 U.S.C. 154(b) by 314 days.

(21) Appl. No.: 17/141,191

(22) Filed: Jan. 4, 2021

(65) Prior Publication Data
US 2021/0399377 A1   Dec. 23, 2021

(30) Foreign Application Priority Data

Jun. 19, 2020  (CN) .......................... 202010563589.1
Nov. 16, 2020  (CN) .......................... 202011279689.8

(51) Int. Cl.
*H01M 10/00* (2006.01)
*H01M 50/209* (2021.01)
(Continued)

(52) U.S. Cl.
CPC ....... *H01M 50/298* (2021.01); *H01M 50/209* (2021.01); *H01M 50/509* (2021.01); *H01M 50/531* (2021.01)

(58) Field of Classification Search
CPC ............. H01M 50/298; H01M 50/209; H01M 50/509; H01M 50/531; H01M 50/507; H01M 50/514
See application file for complete search history.

(56) References Cited

U.S. PATENT DOCUMENTS

| 9,666,840 | B2 * | 5/2017 | Sakai | ................... | H01M 50/264 |
| 2015/0064524 | A1 * | 3/2015 | Noh | ..................... | H01M 50/522 |
| | | | | | 429/90 |

(Continued)

FOREIGN PATENT DOCUMENTS

| CN | 104425792 | 3/2015 |
| CN | 106233502 | 12/2016 |

(Continued)

OTHER PUBLICATIONS

Fang et al. (WO2018059143A1 and using Machine Translation as English version) (Year: 2018).*

(Continued)

*Primary Examiner* — Nicholas P D'Aniello
*Assistant Examiner* — Joshua P McClure
(74) *Attorney, Agent, or Firm* — JCIP GLOBAL INC.

(57) ABSTRACT

A battery module includes a jumper electrode connector a neighbor electrode connector, and batteries. The jumper electrode connector is configured for the electrical connection between the batteries arranged at intervals, and the neighbor is configured for the electrical connection between the adjacent batteries, thereby realizing the connection relationship of the batteries in the battery module. The jumper electrode connector is formed with a notch in a first direction and toward an outside of the battery module, and the neighbor electrode connector is arranged in the notch.

6 Claims, 13 Drawing Sheets

(51) Int. Cl.
  *H01M 50/298* (2021.01)
  *H01M 50/509* (2021.01)
  *H01M 50/531* (2021.01)

(56) References Cited

U.S. PATENT DOCUMENTS

| | | | |
|---|---|---|---|
| 2018/0151921 A1* | 5/2018 | Yun | H01M 10/482 |
| 2018/0326863 A1* | 11/2018 | Soki | H01M 50/209 |
| 2019/0198845 A1 | 6/2019 | Bae et al. | |
| 2019/0363324 A1* | 11/2019 | Liu | H01M 50/507 |
| 2020/0091474 A1 | 3/2020 | Zeng et al. | |
| 2020/0091487 A1* | 3/2020 | Zeng | H01M 50/209 |
| 2020/0091489 A1* | 3/2020 | Zeng | H01M 50/505 |
| 2020/0127259 A1* | 4/2020 | Yoshida | H01M 50/298 |

FOREIGN PATENT DOCUMENTS

| | | | | |
|---|---|---|---|---|
| CN | 209447908 | | 9/2019 | |
| CN | 110911624 | | 3/2020 | |
| CN | 210136940 | | 3/2020 | |
| CN | 111081961 | | 4/2020 | |
| CN | 111081961 A | * | 4/2020 | H01M 50/502 |
| WO | WO-2018059143 A1 | * | 4/2018 | H01M 10/613 |

OTHER PUBLICATIONS

Guo et al. (CN111081961A and using Machine Translation as the English version) (Year: 2020).*

Office Action of China Counterpart Application, with English translation thereof, issued on Aug. 9, 2022, pp. 1-18.

"Search Report of Europe Counterpart Application", issued on Jul. 9, 2021, p. 1-p. 8.

Office Action of China Counterpart Application, with English translation thereof, issued on Feb. 12, 2023, pp. 1-17.

"Office Action of Europe Counterpart Application", issued on Aug. 9, 2024, p. 1-p. 4.

* cited by examiner

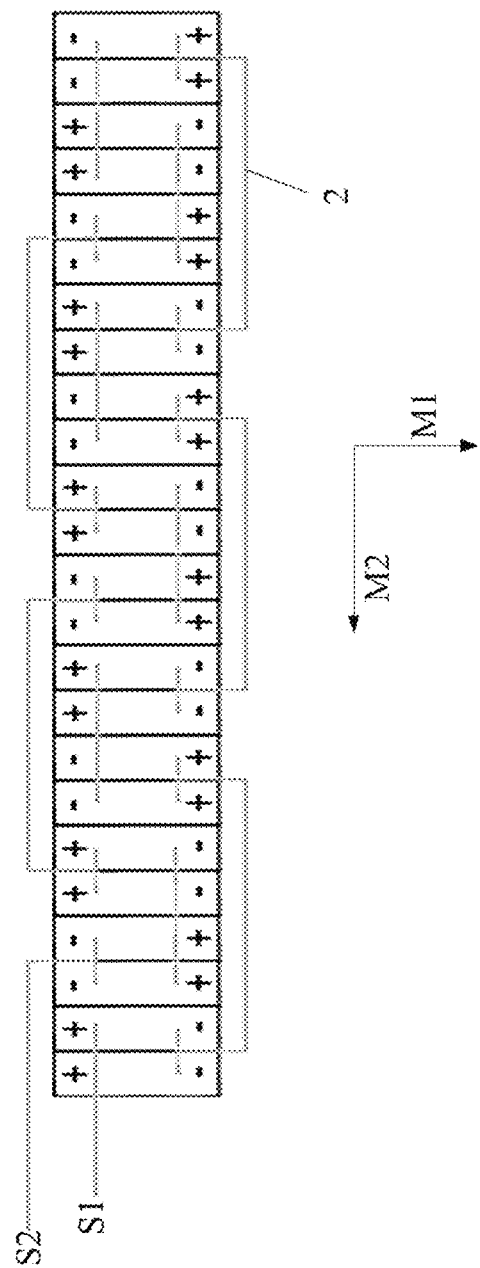

BATTERY MODULE

CROSS-REFERENCE TO RELATED APPLICATION

This application claims the priority benefit of China application serial no. 202010563589.1, filed on Jun. 19, 2020 and 202011279689.8, filed on Nov. 16, 2020. The entirety of each of the above-mentioned patent applications is hereby incorporated by reference herein and made a part of this specification.

BACKGROUND

Field of the Disclosure

The disclosure relates to the technical field of batteries, in particular to a battery module.

Description of Related Art

Typically a battery module can include multiple batteries, and the connection relationship between the batteries can mainly include series connection of batteries, or series connection of some batteries and parallel connection of some batteries. Specifically, in order to realize the above-mentioned connection relationships of the batteries, electrode connectors are required in this regard. However, the conventional arrangement of electrode connectors limits the diversity of battery module configurations, cannot satisfy heat dissipation and safety requirement, and is not conducive to improve energy density of the battery module.

SUMMARY OF THE DISCLOSURE

An embodiment of the disclosure provides a battery module, including a neighbor electrode connector, a jumper electrode connector, and a battery. A number of the battery is greater than or equal to four. The neighbor electrode connector is configured to electrically connect a plurality of the batteries arranged adjacently. The jumper electrode connector is configured to electrically connect a plurality of the batteries arranged at intervals. The jumper electrode connector is provided with a notch in the first direction and toward an outside of the battery module, and the neighbor electrode connector is provided in the notch. The first direction is perpendicular to an arrangement direction of the batteries.

BRIEF DESCRIPTION OF THE DRAWINGS

FIG. 19 is a schematic diagram of the connection relationship of batteries provided in an embodiment of the disclosure.

DESCRIPTION OF EMBODIMENTS

The specific implementations of the battery module provided in the embodiments of the disclosure will be described in detail below in conjunction with the accompanying drawings. It should be noted that the described embodiments are only a part of the embodiments of the disclosure, rather than all the embodiments. Based on the embodiments of the disclosure, all other embodiments obtained by those of ordinary skill in the art without inventive effort shall fall within the protection scope of the disclosure.

Typically a battery module can include multiple batteries, and the connection relationship between the batteries can mainly include series connection of batteries, or series connection of some batteries and parallel connection of some batteries. Specifically, in order to realize the above-mentioned connection relationships of the batteries, electrode connectors are required in this regard.

In order to achieve diversity of battery module configurations, when conventional electrode connectors are configured to connect batteries that are arranged at intervals in series and/or in parallel, different electrode connectors often need to be stacked and staggered along the height direction of the battery module. In order to satisfy the specific series-parallel relationship of the batteries inside the battery module and avoid safety hazards such as short circuits, an insulation protection structure needs to be provided between the above-mentioned electrode connectors that are stacked and staggered, and the configuration of the insulation protection structure greatly increases the cost of material and process. Moreover, the electrode connectors arranged in a stacked and staggered manner are not conducive to heat dissipation and easily lead to heat accumulation on the electrode connectors, which ultimately affects the safety of the battery module and is not conducive to improving the energy density of the battery module.

In order to solve the above-mentioned problem, an embodiment of the disclosure provides a battery module, which is configured to achieve the diversity of the battery module configuration and optimize the structure of the battery module while realizing the connection relationship of the batteries.

Figure 1:
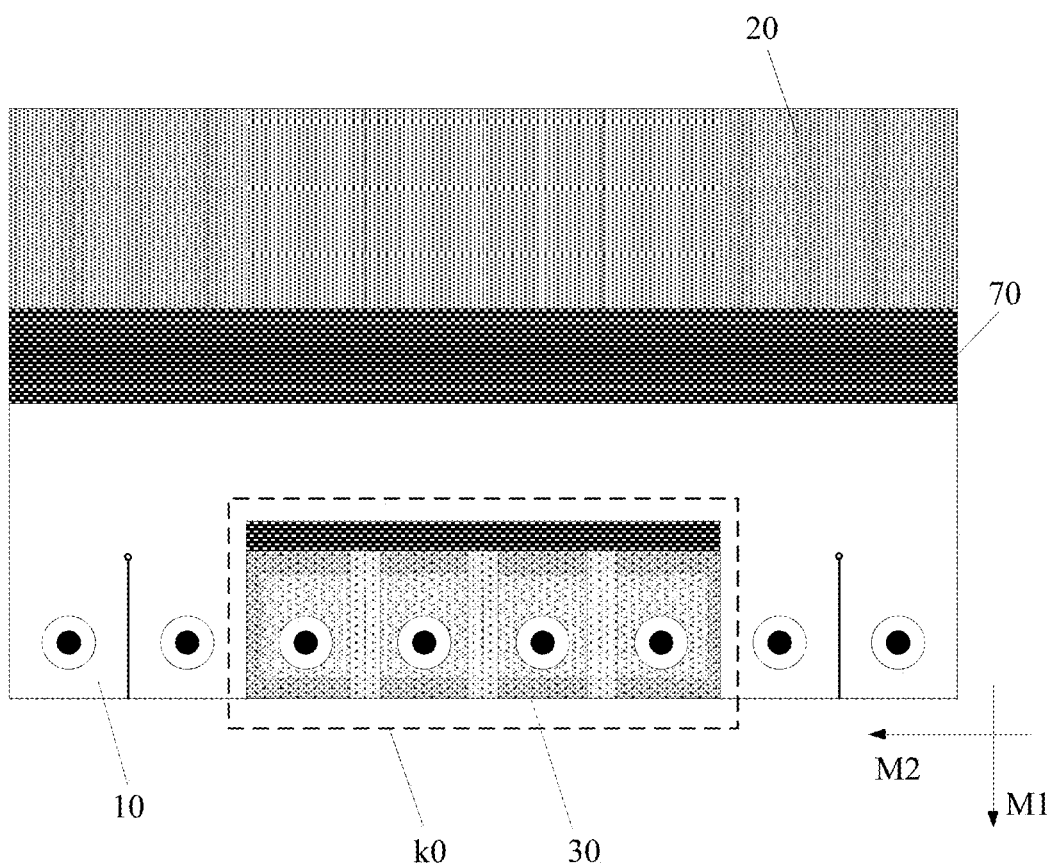
FIG. 1 is a schematic structural diagram of a battery module provided in an embodiment of the disclosure.

Specifically, a battery module provided in an embodiment of the disclosure, as shown in FIG. 1, may include a jumper electrode connector 10, a neighbor electrode connector 30, and a battery 20. The number of batteries 20 is greater than or equal to four. The neighbor electrode connector 30 is configured to electrically connect a plurality of batteries 20 arranged adjacently. The jumper electrode connector 10 is configured to electrically connect a plurality of batteries 20 arranged at intervals. The jumper electrode connector 10 is provided with a notch k0 along the first direction (the direction M1 shown in FIG. 1) and toward the outside of the battery 20 module (the direction indicated by the direction M1 in FIG. 1 is the outside of the battery 20 module), and the neighbor electrode connector 30 is provided in the notch. Specifically, the first direction is perpendicular to the arrangement direction of the batteries 20 (the arrangement direction of the batteries 20 is a direction M2 as shown in FIG. 1).

For example, referring to FIG. 1, the jumper electrode connector 10 is configured to connect four batteries 20 arranged at intervals. Or, see FIG. 2 (for clarity, the neighbor electrode connector is not shown in FIG. 2), the jumper electrode connector 10 is configured to connect the two batteries 20 arranged at intervals. Certainly, in actual situations, the number of batteries 20 to be electrically connected by the jumper electrode connector 10 is not limited to the number shown in FIG. 1 and FIG. 2, and may be other numbers such as six batteries 20 or eight batteries 20, etc., which can be set according to the actual situation, as long as the batteries 20 arranged at intervals can be electrically connected.

Certainly, in the battery module, a part of the neighbor electrode connector 30 can be arranged in the notch of the jumper electrode connector 10, and the remaining part of the neighbor electrode connector 30 may not be arranged in the notch of the jumper electrode connector 10, such that the connection relationship of the batteries can be realized.

In addition, the number of batteries 20 to be electrically connected by the neighbor electrode connector 30 may be 4 (as shown in FIG. 1), 2 or 6, etc., which can be set according to actual needs, the disclosure provides no limitation thereto, and FIG. 1 only serves as an example for explanation.

In this way, the battery module may include a jumper electrode connector and a neighbor electrode connector, so as to realize the electrical connection of the batteries arranged at intervals and the electrical connection of the adjacent batteries, thereby realizing the connection relationship of the batteries in the battery module.

Moreover, since the jumper electrode connector is formed with a gap along the first direction and toward the outside of the battery module, the neighbor electrode connector can be arranged in the notch. The proper combination of the two electrode connectors can significantly expedite heat dissipation of the electrode connectors, thereby realizing diversity of circuit connection inside the battery module, meeting the demand of the battery module for the variable circuit, and helping improve the energy density.

Furthermore, by properly arranging the jumper electrode connector and the neighbor electrode connector, the positive and negative output poles of the battery module can be arranged on the same side to realize the same side output of the battery module and simplify the connection structure of the battery modules.

Figure 3:
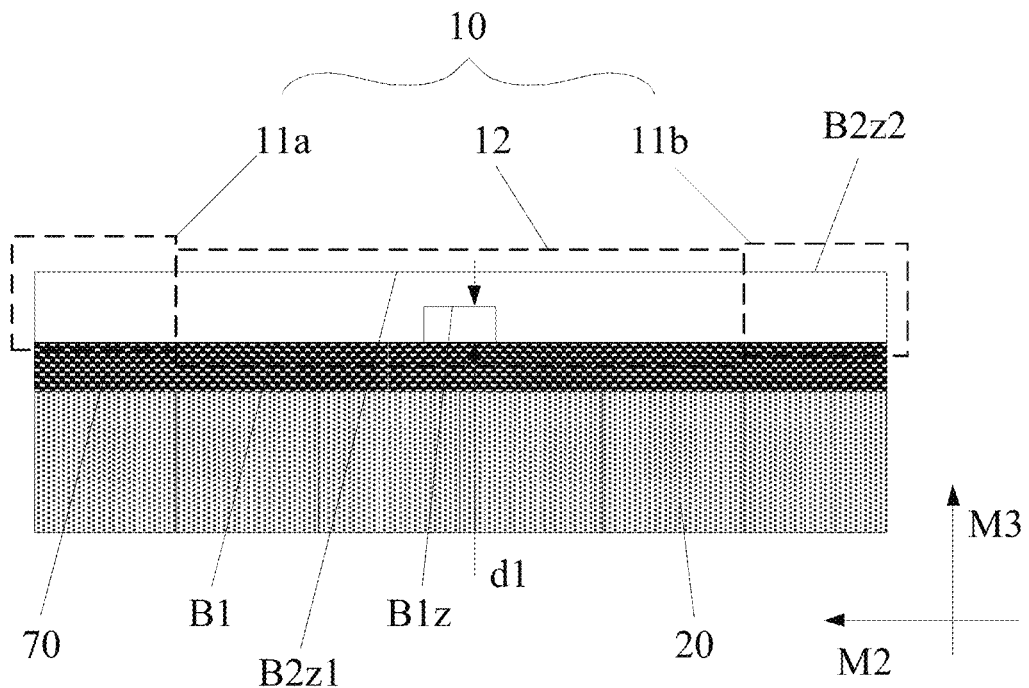
FIG. 3 is a cross-sectional view taken along a direction X1-X2 in FIG. 2.

Optionally, in the embodiment of the disclosure, the battery module may further include a wire harness plate. The wire harness plate is arranged between the battery and the jumper electrode connector. A surface of the jumper electrode connector close to one side of the wire harness plate is a first surface, and there is a gap between at least a partial region of the first surface and the wire harness plate. Referring to FIG. 1 and FIG. 3, the wire harness plate is denoted by 70, and is arranged between the battery 20 and the connector (including the jumper electrode connector 10 and the neighbor electrode connector 30) to facilitate fixing the connectors. Furthermore, in order to show the position of the battery 20, only a part of the wire harness plate is shown when drawing the wire harness plate 70.

Figure 2:
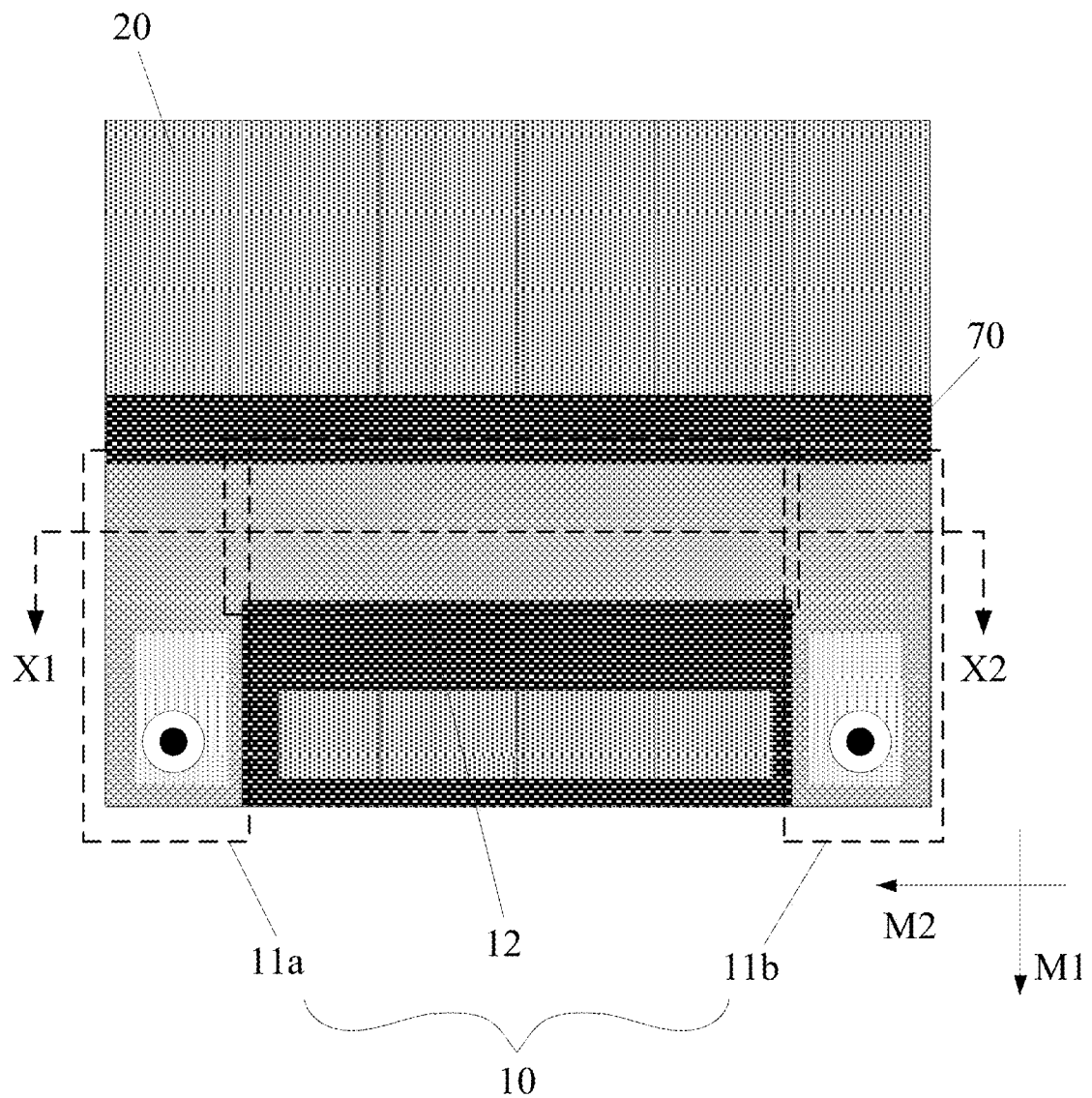
FIG. 2 is a schematic structural diagram of another battery module provided in an embodiment of the disclosure.

Refer to FIG. 3, which is a cross-sectional view taken along the direction X1-X2 in FIG. 2. A surface of the jumper electrode connector 10 10 close to one side of the wire harness plate 70 is the first surface (denoted by B1), and there is a gap (a gap shown by d1) formed between at least a partial region of the first surface B1 and the wire harness plate 70.

Optionally, in the embodiment of the disclosure, the battery module may further include a signal acquisition structure. The signal acquisition structure is electrically connected with the jumper electrode connector and the neighbor electrode connector. The signal acquisition structure includes a transmission portion, and the transmission portion passes through the gap.

Figure 4:
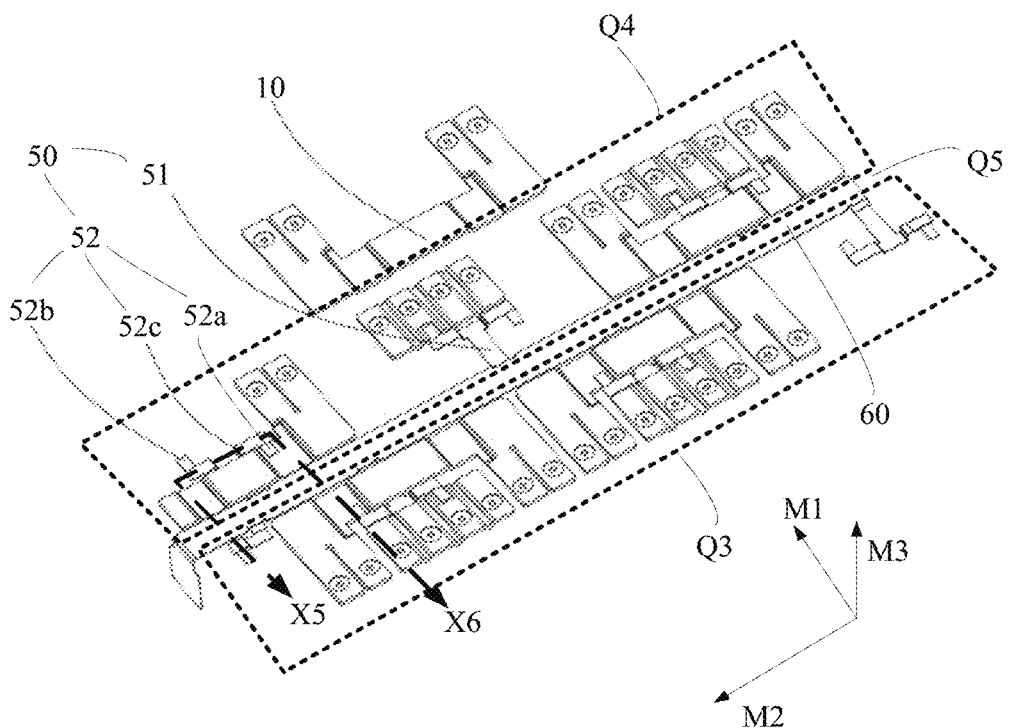
FIG. 4 is a perspective structural diagram of a battery module provided in an embodiment of the disclosure.
Figure 5:
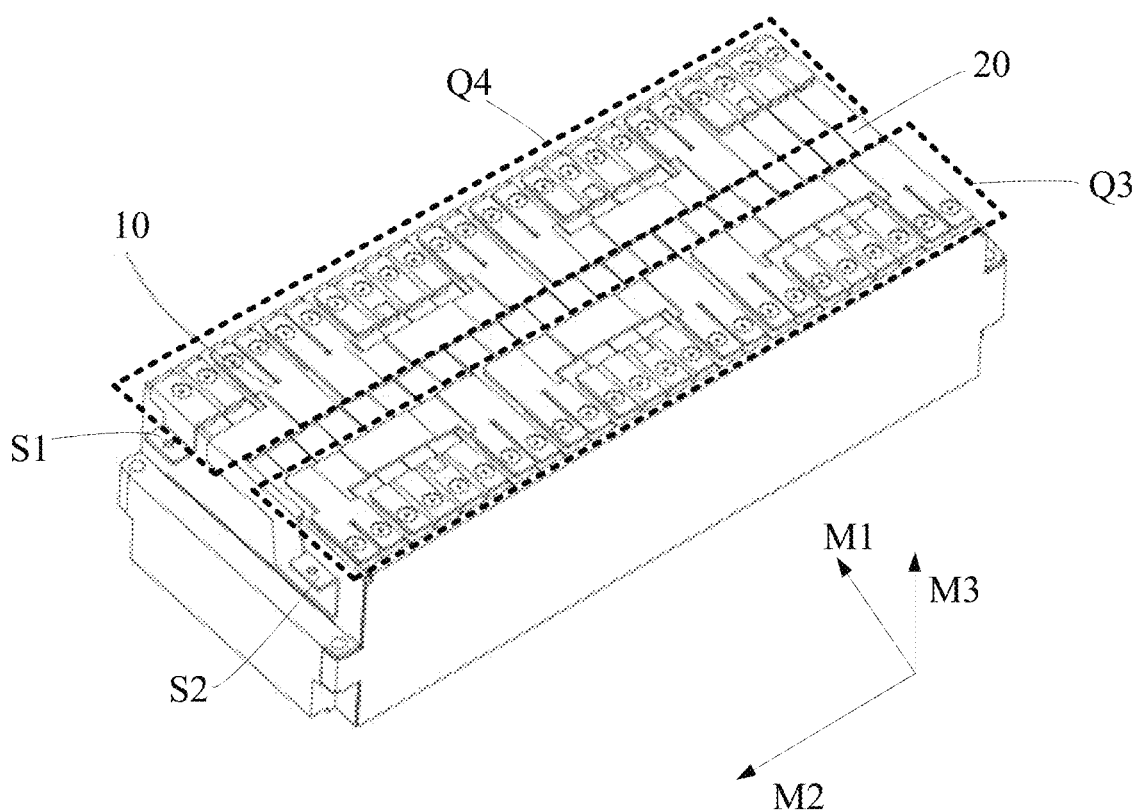
FIG. 5 is a perspective structural diagram of another battery module provided in an embodiment of the disclosure.
Figure 6:
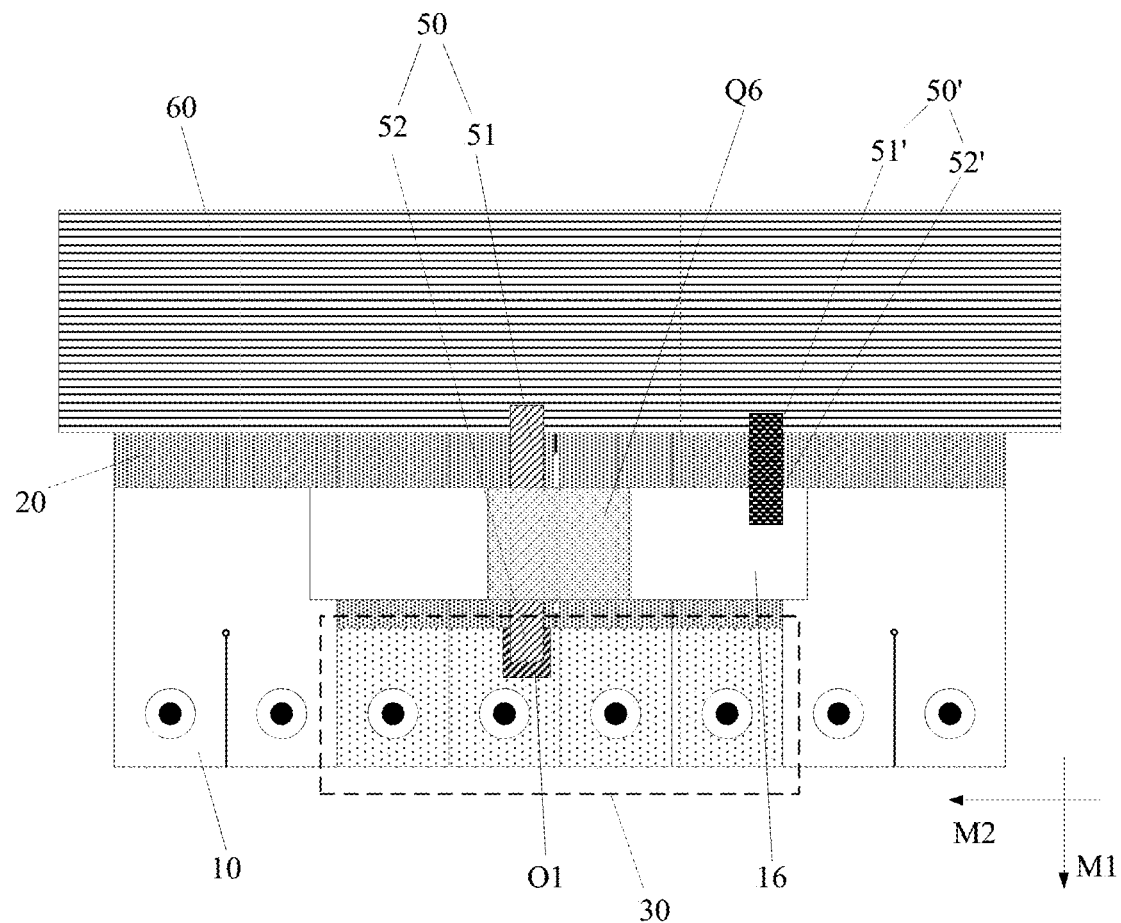
FIG. 6 is a schematic structural diagram of another battery module provided in an embodiment of the disclosure.

For example, as shown in FIG. 4 to FIG. 6, FIG. 4 shows part of the jumper electrode connector, part of the neighbor electrode connector, and the signal acquisition structure, but the battery is not shown. FIG. 5 shows the battery, as well as the jumper electrode connector and the neighbor electrode connector that are connected to the battery, but the signal acquisition structure is not shown, and FIG. 4 and FIG. 5 are perspective structural views. FIG. 6 shows one jumper electrode connector and one neighbor electrode connectorn, a part of the battery and a part of the flexible circuit board, as well as the signal acquisition structure, and FIG. 6 is a schematic diagram of a planar structure.

In addition, in order to clearly show the positional relationship of the structures, FIG. 4 and FIG. 5 show a three-dimensional space composed of directions M1, M2, and M3.

As shown in FIG. 4 to FIG. 6, the signal acquisition structure 50 includes a transmission portion 51 that can pass through the gap between at least a partial region of the first surface of the jumper electrode connector 10 and the wire harness plate (as shown in FIG. 4 and FIG. 6).

To make one thing clear, in FIG. 4, the position of the jumper electrode connector marked 10 is not the actual setting position. Here, the jumper electrode connector marked 10 is moved away from the actual setting position to clearly show the structure of the transmission portion overlapping with the jumper electrode connector, and the actual setting position of each connector can be seen in FIG. 5.

In this way, because there is a gap between at least a partial region of the first surface of the jumper electrode connector and the wire harness plate, the transmission portion in the signal acquisition structure can pass through the gap, which is beneficial to avoid increasing the thickness of the battery module, so as to facilitate realization of the slim design of the battery module. In the meantime, the structure of the battery module can be optimized, and the space can be fully utilized, thereby helping to reduce the volume of the battery module.

Specifically, in the embodiment of the disclosure, an insulation enhancement structure is provided between the transmission portion and the jumper electrode connector. Or, there is a gap between the transmission portion and the jumper electrode connector. The arrangement of the transmission portion and the jumper electrode connector may include as follows. An insulation enhancement structure (such as but not limited to an insulating coating) is provided in the region where the jumper electrode connector faces the signal acquisition structure and overlaps the signal acquisition structure. Alternatively, an insulating structure is separately provided between the signal acquisition structure and the jumper electrode connector. Or, there is a gap between the transmission portion and the jumper electrode connector.

Certainly, in addition to the abovementioned methods, other methods that can achieve insulation between the signal acquisition structure and the jumper electrode connector can also be adopted, as long as the signal acquisition structure can be insulated from the jumper electrode connector. The disclosure provides no limitation to which method is adopted.

Moreover, by keeping the signal acquisition structure insulated from the jumper electrode connector, not only can the short circuit between the signal acquisition structure and the jumper electrode connector be avoided, thereby avoiding adverse effects on signal transmission, but also it is possible to prevent the signal acquisition structure from causing damage to the jumper electrode connector, thereby improving the reliability of the battery module.

Optionally, in the embodiment of the disclosure, the jumper electrode connector includes two first divisions and a second division. The first divisions extend in a first direction, and each of the first divisions is electrically connected to the batteries arranged at intervals. The second division is electrically connected to the two first divisions, the second division extends along the arrangement direction of the batteries, and the second division is disposed between the two first divisions. The two first divisions and the second division form the notch. For example, referring to FIG. 2 and FIG. 3, the two first divisions are represented by 11a and 11b respectively, and the two first divisions (such as 11a and 11b) extend along the direction M1. The second division is represented by 12, and the second division 12 extends along the direction M2. In this way, by arranging the structure of the jumper electrode connector, a notch can be formed, so that the neighbor electrode connector can be arranged in the notch.

Specifically, in the embodiment of the disclosure, as shown in FIG. 3, there is a gap between at least a partial region corresponding to the second division 12 in the first surface B1 and the wire harness plate 70. In this way, a signal acquisition structure is provided in the battery module, and when the signal acquisition structure passes through the gap, the gap is set in the region where the second division is located, such that it is possible to prevent the signal acquisition structure from causing adverse effects on the electrical connection between the first division and the battery. In this manner, when signal collection is realized, the reliability of the battery module can be improved as well.

Specifically, in the embodiment of the disclosure, the first surface includes a first sub-surface, a gap is formed between the first sub-surface and the wire harness plate, and the first sub-surface is located in a region where the second division is located. For example, referring to FIG. 3, the two first divisions are represented by 11a and 11b, the second division is represented by 12, the first sub-surface is represented by B1z, and the first sub-surface B1z is located in the region where the second division 12 is located.

Optionally, in the embodiment of the disclosure, the battery module may further include a signal acquisition structure. The signal acquisition structure is electrically connected with the jumper electrode connector and the neighbor electrode connector. The signal acquisition structure includes a transmission portion. The jumper electrode connector is provided with a first buffer portion in a bent shape, and the first buffer portion is stretchingly deformed or contractingly deformed along the arrangement direction of the batteries under the action of external force. The transmission portion is arranged in the first buffer portion.

Figure 7:
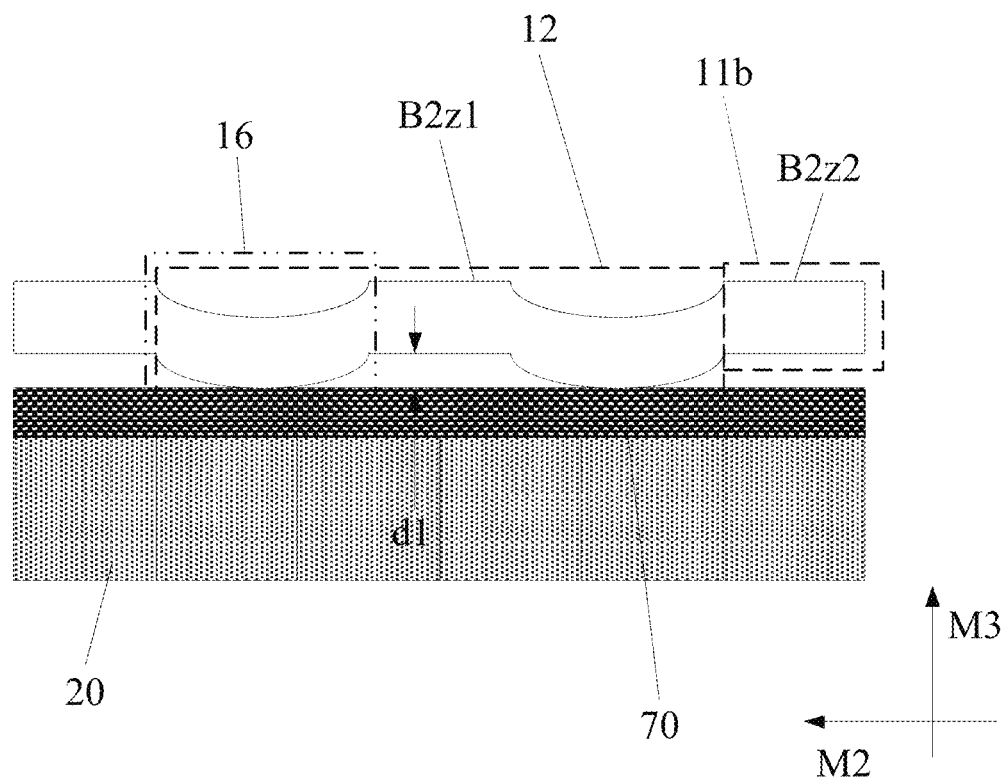
FIG. 7 is another cross-sectional view taken along the direction X1-X2 in FIG. 2.
Figure 8:
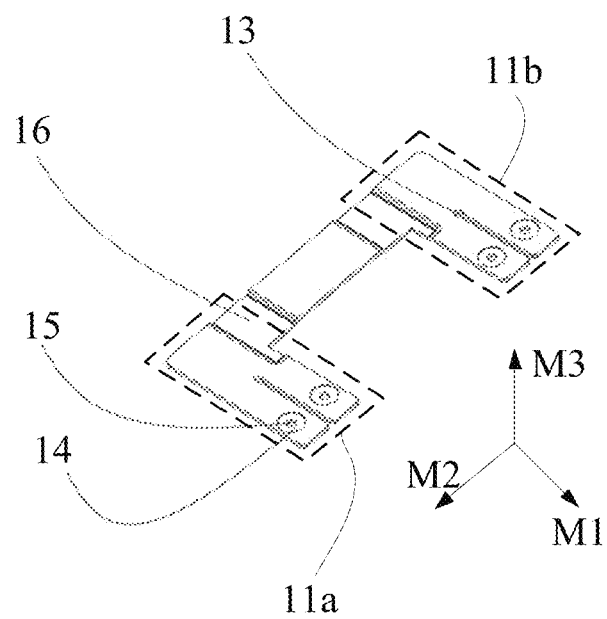
FIG. 8 is a perspective structural diagram of a jumper electrode connector provided in an embodiment of the disclosure.

Referring to FIG. 7 and FIG. 8, FIG. 7 is another cross-sectional view taken along the direction X1-X2 in FIG. 2, and FIG. 8 is a perspective structural diagram of a jumper electrode connector. The jumper electrode connector has a first buffer portion 16, and the first buffer portion 16 can be stretchingly deformed or compressive deformed along the direction M2 under the action of external force.

Figure 9:
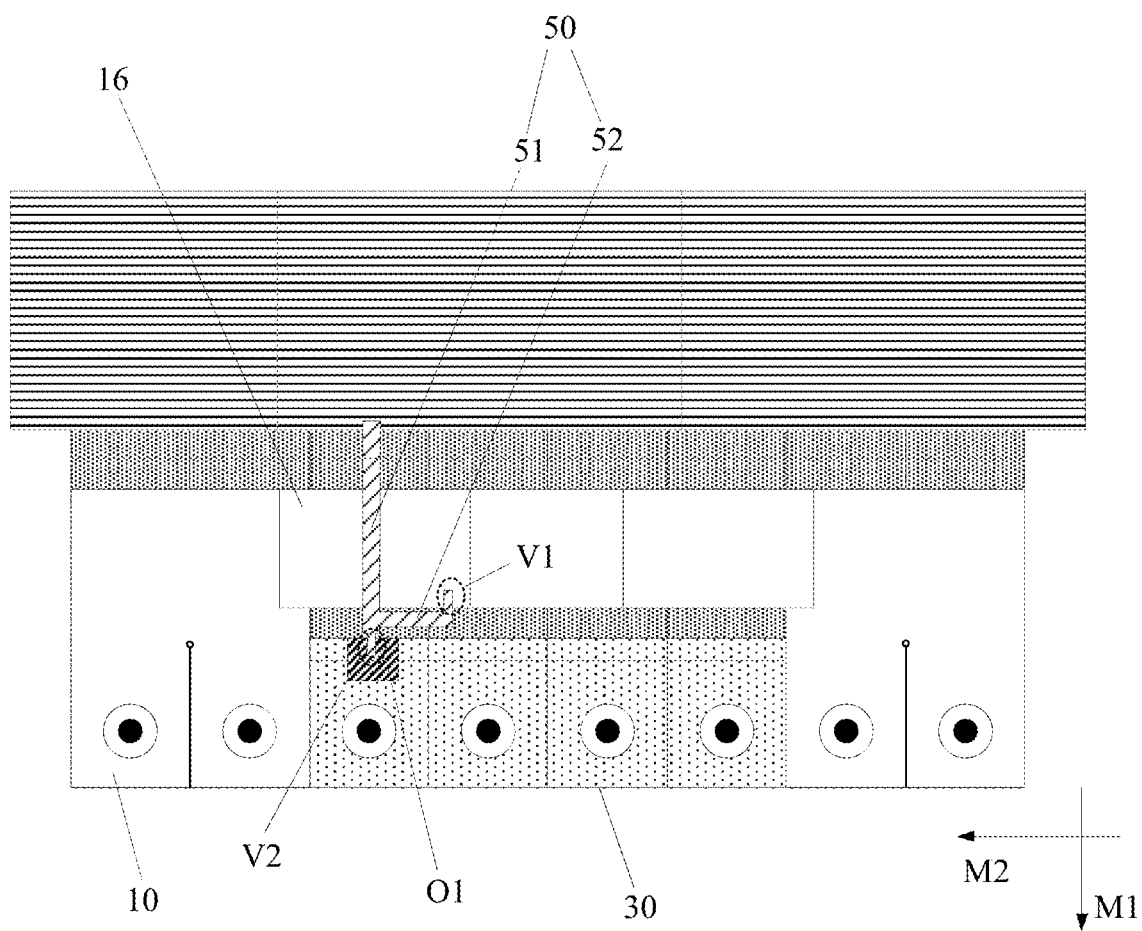
FIG. 9 is a schematic structural diagram of yet another battery module provided in an embodiment of the disclosure.

Referring to FIG. 9, the transmission portion 51 is disposed in the first buffer portion 16 so that the transmission portion 51 can pass through the first buffer portion 16. In addition, at least one first buffer portion 16 may be provided, such as two as shown in FIG. 7 and FIG. 8, but not limited to two, and the number of first buffer portion 16 may be set according to actual needs and the estimated swelling condition of batteries. The disclosure provides no limitation thereto.

When a plurality of first buffer portions 16 are provided, such as two shown in FIG. 7 and FIG. 8, a gap is formed in the region between the two first buffer portions 16 and between the jumper electrode connector and the wire harness plate. Therefore, when the gap is arranged, there is no need to set a specific gap as in FIG. 3, and the gap (e.g., the gap shown by d1) can be formed by using the first buffer portion 16.

Certainly, in the actual situation, the partial region of the first surface B1 where the gap exists is not limited to the position shown in FIG. 3, and may also be other positions, which can be set according to the actual situation, the disclosure provides no limitation thereto.

To make one thing clear, when the first buffer portion is configured, the specific implementation form of the bending shape can include V-shape, Z-shape, wave shape, convex shape or groove shape, etc., as long as the first buffer portion can be deformed under the action of external force. That is, there is no specific limitation to the specific implementation of the bending shape. In addition, through the arrangement of the first buffer portion, when the batteries arranged at intervals swell, the first buffer portion can serve a certain buffering function, so it is possible to prevent the jumper electrode connector from being pulled and cracked when the batteries swell, thereby improving the reliability of the jumper electrode connector.

In addition, the slot in the first buffer portion can be used to accommodate the transmission portion, the temperature collector for collecting temperature, and the end portion of the signal acquisition structure for collecting voltage signals. Since the temperature collector has a certain thickness, when being accommodated in the slot, it is possible to prevent the thickness of the battery module from being increasing, so that the structure of the battery module can be optimized, thereby facilitating realization of the slim design of the battery module.

In specific implementation, in the embodiment of the disclosure, when setting the signal acquisition structure, the following specific configuration can be adopted.

1. A signal acquisition structure is electrically connected to a jumper electrode connector and a neighbor electrode connector.

Optionally, in the embodiment of the disclosure, the signal acquisition structure further includes a collection portion electrically connected to the transmission portion. The collection portion includes a first collection terminal and a second collection terminal. The first collection terminal is electrically connected to the jumper electrode connector. The second collection terminal is electrically connected to the neighbor electrode connector. Specifically, referring to FIG. 4, 52 denotes a collection portion, 52a denotes a first collection terminal, and 52b denotes a second collection terminal. Furthermore, as shown in FIG. 9, the first collection terminal is electrically connected to the jumper electrode connector 10 (as shown in V1), the second collection terminal is electrically connected to the electrode connector 30 for adjacent connection (as shown in V2). In this way, it is possible to realize the electrical connection between the collection portion and the jumper electrode connector and the neighbor electrode connector respectively.

Figure 10:
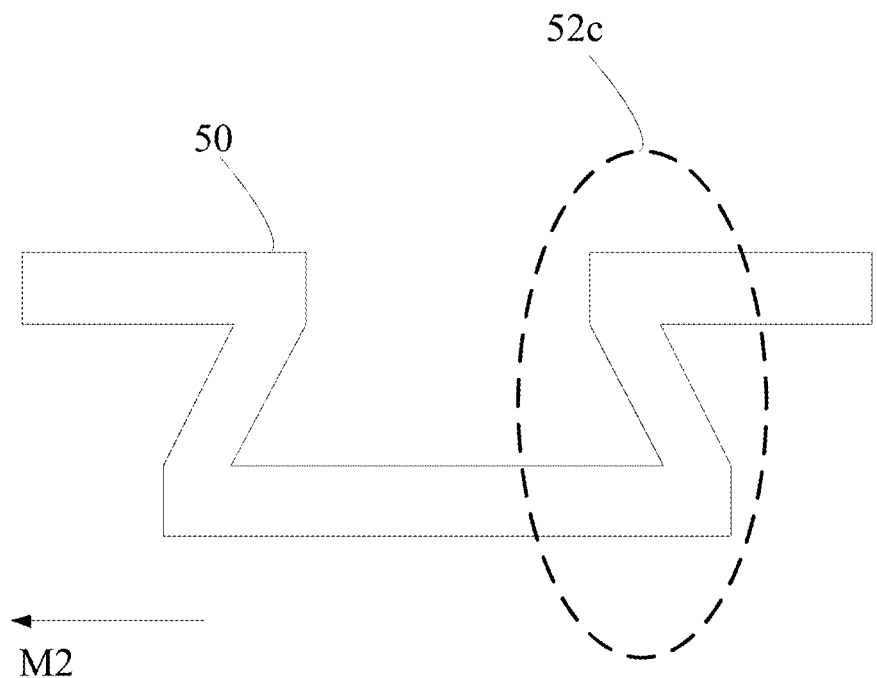
FIG. 10 is a cross-sectional view taken along a direction X5-X6 in FIG. 4.
Figure 11:
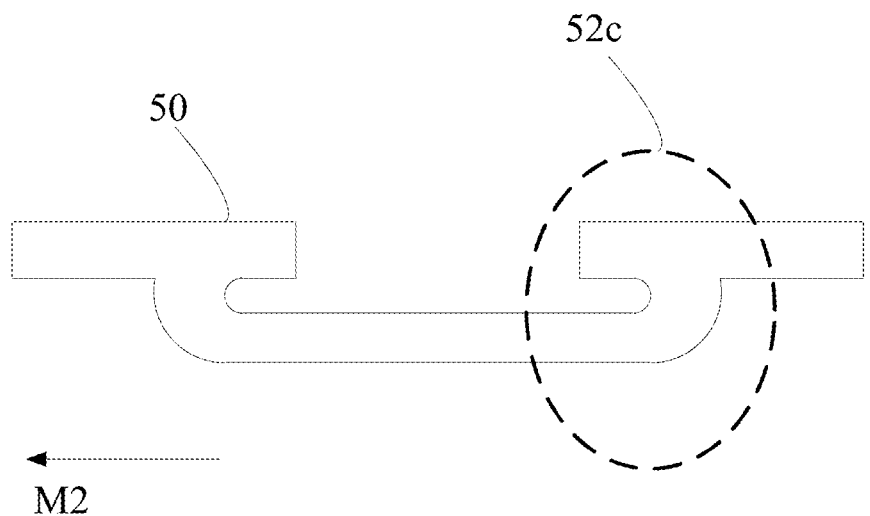
FIG. 11 is another cross-sectional view taken along the direction X5-X6 in FIG. 4.

Specifically, in the embodiment of the disclosure, the collection portion further includes a buffer structure respectively connected to the first collection terminal and the second collection terminal. The buffer structure is stretchingly deformed or contractingly deformed along the arrangement direction of the batteries under the action of external force. Referring to FIG. 10 and FIG. 11, FIG. 10 and FIG. 11 are cross-sectional views taken along directions X5 and X6 in FIG. 4, the buffer structure 52c can be, but not limited to, a Z-shape (shown as 52c in FIG. 10) or a U-shape (shown as 52c in FIG. 11), etc., the disclosure provides no limitation to the specific form of the buffer structure. In this way, when the first collection terminal and the second collection terminal are displaced, the part shown in 52c can be flattened (or interpreted as straightened) along the direction M2 to achieve a certain buffering effect, thereby preventing the first collection terminal and the second collection terminal from falling off, and avoid damaging the collection portion.

Specifically, in the embodiment of the disclosure, a wire harness plate is further included, the wire harness plate is arranged between the battery and the neighbor electrode connector, and a first slot is provided on one side of the neighbor electrode connector away from the wire harness plate. The first collection terminal is electrically connected to the jumper electrode connector at the first buffer portion. The second collection terminal is electrically connected to the neighbor electrode connector at the first slot. As shown in FIG. 9, the first collection terminal is electrically connected to the jumper electrode connector 10 at the first buffer portion 16 (as shown in V1), and the second collection terminal is electrically connected to the electrode connector 30 for adjacent connection at the first slot O1 (as shown in V2). In this way, not only can the collection portion be electrically connected to the jumper electrode connector and the neighbor electrode connector, but also it is possible to prevent the thickness of the battery module from increasing, and the structure of the battery module can be optimized simultaneously.

Optionally, in the embodiment of the disclosure, both the first collection terminal and the second collection terminal can be made of conductive materials, such as but not limited to metal sheets (such as nickel sheets, aluminum sheets, or copper sheets, etc.) to achieve the collection of battery voltage, so as to control the charge and discharge of the battery.

2. A signal acquisition structure is electrically connected to only one jumper electrode connector or one neighbor electrode connector.

Optionally, in the embodiment of the disclosure, as shown in FIG. 6, for the electrode connector 30 for adjacent connection located in the notch, the transmission portion 51 passes through the gap between the partial region of the first surface of the jumper electrode connector 10 and the wire harness plate (not shown) (as shown in FIG. 6, the region Q6 has increased transparency to facilitate describing the positional relationship between the transmission portion 51 and the jumper electrode connector 10), the collection portion 52 corresponding to the transmission portion 51 is only electrically connected to the electrode connector 30 for adjacent connection. For the jumper electrode connector 10, because the jumper electrode connector 10 is located close to the flexible circuit board 60, the signal acquisition structure 50' can be directly electrically connected to the jumper electrode connector 10.

Specifically, the signal acquisition structure 50' may also include a transmission portion 51' and a collection portion 52. Also, for the signal acquisition structure 50', when the collection portion 52' needs to be electrically connected to the jumper electrode connector 10, the collection terminal 52' is only electrically connected to the jumper electrode connector 10 at the bend of the first buffer portion 16. For the signal acquisition structure 50, if the collection portion 52 needs to be electrically connected to the electrode connector 30 for adjacent connection, the collection terminal 52 is only electrically connected to the electrode connector 10 for adjacent connection at the first slot O1. In this way, the structure of the signal acquisition structure can be simplified. Even if the signal acquisition structure electrically connected to the jumper electrode connector is abnormal, the abnormality will not affect the signal acquisition of the neighbor electrode connector. Likewise, when the signal acquisition structure electrically connected to the neighbor electrode connector is abnormal, the abnormality will not affect the signal acquisition of the jumper electrode connector, so that the reliability of the battery module can be significantly improved.

Optionally, in the embodiment of the disclosure, the signal acquisition structure may be made of an electrically conductive and thermally conductive metal sheet, and keeps the signal acquisition structure insulated from the jumper electrode connector. Specifically, the electrically and thermally conductive metal sheets include, such as but not limited to nickel sheets, aluminum sheets or copper sheets. In this way, the signal acquisition structure can collect the voltage signal on the jumper electrode connector or the neighbor electrode connector. Due to the electrical conductivity, the voltage signal can be transmitted to the flexible circuit board. In the meantime, due to the thermal conductivity, the temperature can be transmitted to one end connected to the flexible circuit board. By providing the temperature collector to collect the temperature on the signal acquisition structure and transmit the temperature to the flexible circuit board, it is possible to realize the control of the bus element and even the signal and temperature of the battery.

Figure 12:
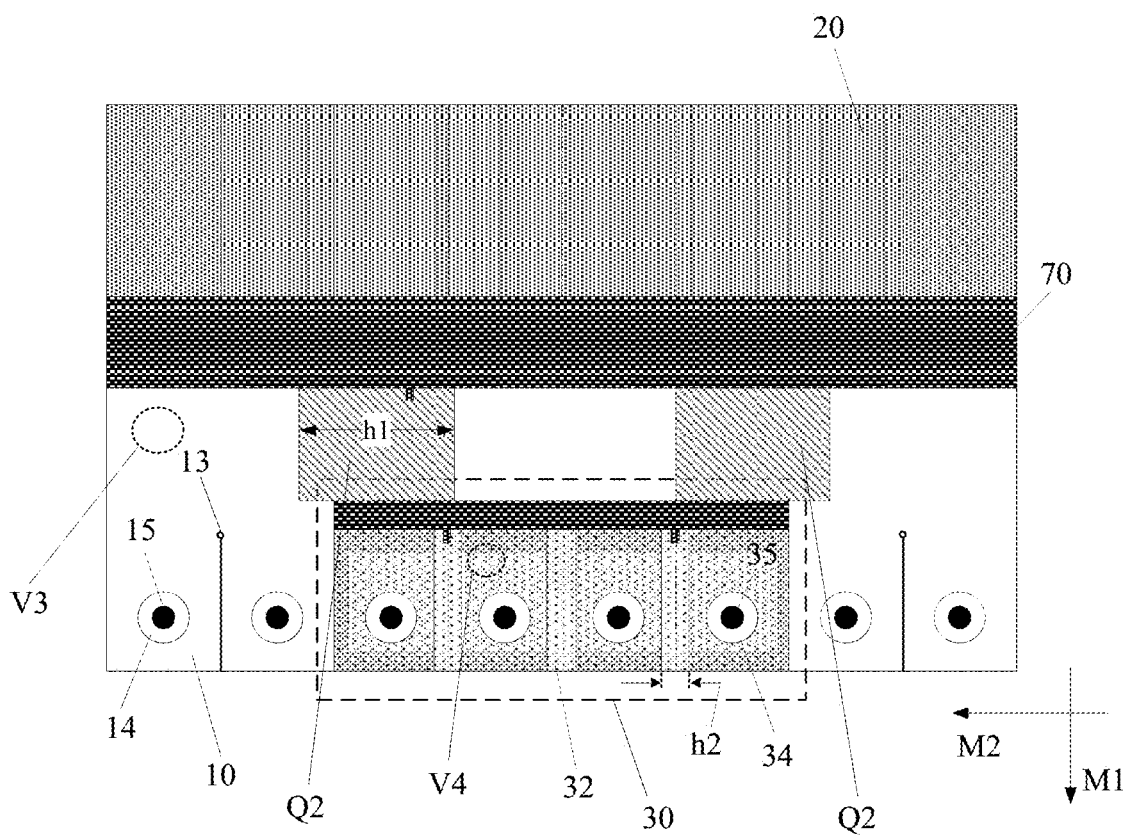
FIG. 12 is a schematic structural diagram of still another battery module provided in an embodiment of the disclosure.

Optionally, in the embodiment of the disclosure, referring to FIG. 8 and FIG. 12, the jumper electrode connector 10 further includes a through hole 15 and a counterbore 14. The through hole 15 is located in the region where the first division (such as 11a and 11b) is located, and the through hole 15 is configured to realize the electrical connection between the jumper electrode connector 10 and the battery 20 as well as the positioning of the battery module during assembly. The counterbore 14 is located in the region where the first division (such as 11a and 11b) is located, and the counterbore 14 is configured to adjust the power of the welding equipment. The thickness of the region where the counterbore 14 is located is less than the thickness of the region in the first division other than the region where the counterbore 14 is located (e.g., the region shown in V3). In this way, through the arrangement of the through holes, not only the electrical connection between the jumper electrode connector and the battery can be realized, but also the positioning of the battery module during assembly can be realized to avoid the misalignment between the jumper electrode connector and the battery, thereby avoiding the misconnection of the batteries. Meanwhile, through the arrangement of the counterbore, the thickness of the region where the counterbore is located can be reduced, so that when assembling by the laser welding equipment, the power requirement of the laser welding equipment is reduced, thereby helping to save energy.

To make one thing clear, optionally, if the thickness of the region (the region shown in V3) in the first division (such as 11a and 11b) other than the region where the counterbore is located is small, the counterbore may not be provided so as to reduce the difficulty of manufacturing the jumper electrode connector, and improve the manufacturing efficiency.

Optionally, in the embodiment of the disclosure, referring to FIG. 8 and FIG. 12, when the jumper electrode connector 10 is electrically connected to N number of batteries 20, and N is an even number greater than 2, the jumper electrode connector 10 further includes a crack stop 13 located in the region where the first division (such as 11a and 11b) is located. In this way, by arranging the crack stopper, when swelling occurs between adjacent batteries, the crack stopper can achieve a certain buffering effect to prevent the jumper electrode connector from being pulled apart, thereby improving the reliability of the jumper electrode connector.

Optionally, in the embodiment of the disclosure, a surface on one side of the jumper electrode connector away from the wire harness plate is a second surface, which includes a second sub-surface corresponding to the region where the first sub-surface is located, and a third sub-surface corresponding to the region where the first division is located, and the second sub-surface and the third sub-surface are in the same plane. For example, referring to FIG. 3 and FIG. 7, the second sub-surface is denoted by B2z1, and the second sub-surface B2z1 and the first sub-surface B1z are disposed opposite to each other and located in the same region. The third sub-surface is denoted by B2z2, and the third sub-surface B2z2 is located in the region where the first division 11b is located, and the second sub-surface B2z1 and the third sub-surface B2z2 are in the same plane. In this way, on the basis of improving the reliability of the jumper electrode connector, it helps to avoid increasing the thickness of the jumper electrode connector, thereby helping to reduce the thickness of the battery module and realizing the slim design of battery module.

Optionally, in the embodiment of the disclosure, a wire harness plate is further included and is arranged between the battery and the jumper electrode connector. The wire harness plate includes a frame and at least one first buckle. The first buckle is located on one side of the jumper electrode connector away from the battery. The frame is located on one side of the jumper electrode connector close to the battery, and the frame is configured to support the jumper electrode connector. Specifically, in the embodiment of the disclosure, a first buffer portion in a bent shape is provided on the jumper electrode connector, and the first buckle is provided corresponding to the first buffer portion. And/or, the jumper electrode connector has a second slot on one side away from the battery, and the first buckle is arranged corresponding to the second slot.

For example, referring to FIG. 12, in order to see the specific structure of the wire harness plate between the connector (including the jumper electrode connector 10 and the electrode connector 30 for adjacent connection) and the battery 20, the jumper electrode connector 10 and electrode connector 30 for adjacent connection are configured to have a certain degree of transparency.

Figure 13:
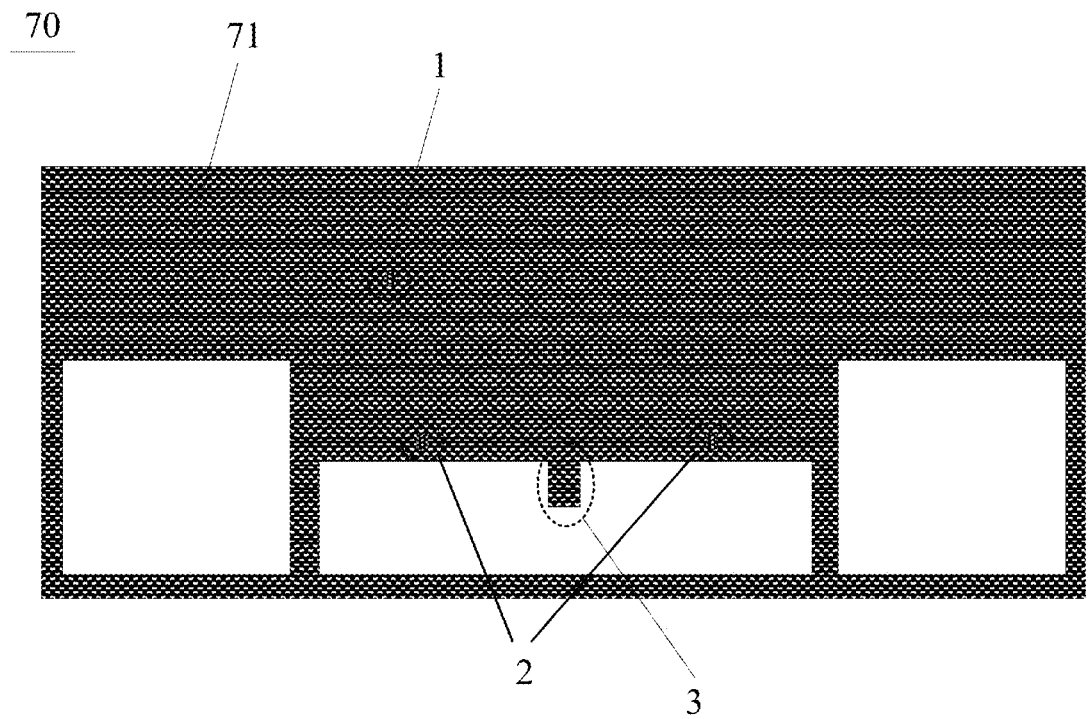
FIG. 13 is a schematic diagram of a partial structure of a wire harness plate provided in an embodiment of the disclosure.

Specifically, referring to the structure of the individual wire harness plate 70 shown in FIG. 13, the frame is indicated by 71, the structure in the dashed circle 1 is the first buckle, and the first buckle and the frame 71 are respectively located at different sides of the jumper electrode connector. Through the configuration of the frame 71 and the first buckle, the jumper electrode connector can be stably fixed, so as to prevent the position of the jumper electrode connector from shifting.

FIG. 12 and FIG. 13 show a first buckle, but in actual situations, the number of first buckles is not limited to that shown in the above figures, and can be set according to actual needs and stability requirements. The disclosure provides no limitation thereto. Moreover, if the region indicated by Q2 in FIG. 12 represents the first buffer portion, the first buckle can be correspondingly arranged on the first buffer portion; or, if the portion indicated by Q2 in FIG. 12 represents the second slot, the first buckle can be correspondingly arranged in the second slot. In this way, the first buckle can be provided through the bent part of the first buffer portion or the second slot, and in combination with the frame, the jumper electrode connector can be well fixed, thereby avoiding the position of the jumper electrode connector from being shifted, thus avoiding problems with the connection relationship between the jumper electrode connector and the battery, and ensuring the normal operation of the battery module.

Optionally, in the embodiment of the disclosure, the first slot on one side of the neighbor electrode connector away from the battery can also be used to accommodate a temperature collector that collects the temperature of the battery.

Figure 14:
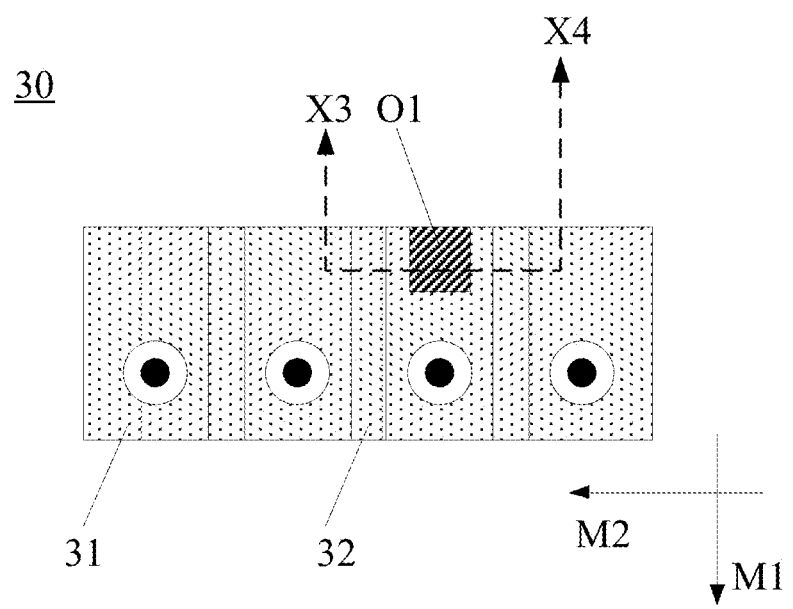
FIG. 14 is a schematic structural view of a neighbor electrode connector provided in an embodiment of the disclosure.
Figure 15:
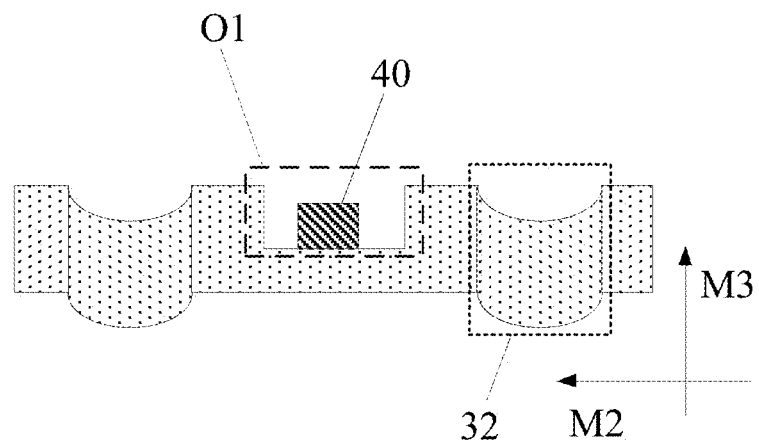
FIG. 15 is a cross-sectional view taken along a direction X3-X4 in FIG. 14.
Figure 16:
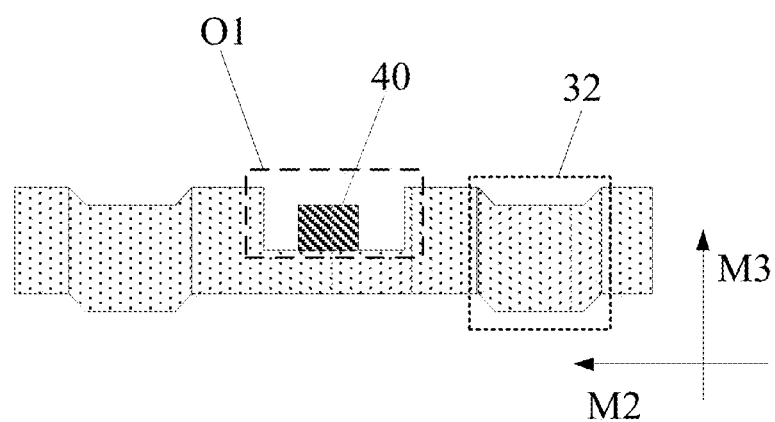
FIG. 16 is another cross-sectional view taken along the direction X3-X4 in FIG. 14.

For example, referring to FIG. 14 to FIG. 16, FIG. 15 is a cross-sectional view taken along the direction X3-X4 in FIG. 14, FIG. 16 is another cross-sectional view taken along the direction X3-X4 in FIG. 14. The first slot is denoted by O1, by providing the first slot O1, the temperature collector 40 can be placed in the first slot O1. Since the temperature collector 40 has a certain thickness, after being placed in the first slot O1, it is possible to avoid the thickness of the battery module from increasing, and also simplify and optimize the structure of the battery module while making good use of the space.

Furthermore, optionally, the depth of the first slot can be set according to the thickness of the temperature collector, as long as the depth does not increase the thickness of the battery module; the disclosure provides no limitation to the depth of the first slot. In addition, the number of the first slot can be one or more. When the number of the first slot is multiple, the first slot for accommodating the temperature collector may be a different slot as opposed to the first slot provided with the second collection terminal mentioned above.

Optionally, in the embodiment of the disclosure, a second buffer portion in a bent shape is provided on the neighbor electrode connector, and the second buffer portion is stretchingly deformed or contractingly deformed along the arrangement direction of the batteries under the action of external force. The wire harness plate is also arranged between the battery and the neighbor electrode connector. The wire harness plate further includes at least one second buckle and at least one third buckle. The second buckle is located on one side of the neighbor electrode connector away from the batteries, and the second buckle is provided corresponding to the second buffer portion. The third buckle is located on one side of the neighbor electrode connector close to the batteries, and the third buckle is provided corresponding to the second buffer portion.

As shown in FIG. 14 to FIG. 16, a second buffer portion 32 in a bent shape is provided on the neighbor electrode connector, and the second buffer portion 32 is stretchingly deformed or contractingly deformed along the arrangement direction of the batteries under the action of external force (the direction M2 as shown in the figure). Specifically, the specific realization form of the bending shape can include V-shape, Z-shape, wave shape, convex shape or groove shape, etc., as long as the deformation can take place under the action of external force; the disclosure provides no limitation to the specific realization of the bending shape.

Referring to FIG. 12 and FIG. 13, the structure represented by the dashed circle 2 is the second buckle, the structure represented by the dashed circle 3 is the third buckle, and the second buckle and the third buckle are respectively located at different sides of the neighbor electrode connector. Specifically, there are two second buckles and one third buckle shown in FIG. 12 and FIG. 13, but in actual situations, the number of second buckles and third buckles is not limited to those shown in the above figures, and can also be set according to actual needs and stability requirements; the disclosure provides no limitation thereto. In this way, through the arrangement of the second buffer portion, when the batteries arranged at intervals swell, the second buffer portion can achieve a certain buffering effect, avoiding the neighbor electrode connector from being pulled and cracked by external force when the battery swells, so as to improve the reliability of the neighbor electrode connector.

Moreover, through the arrangement of the second buckle and the third buckle, the neighbor electrode connector can be stably fixed on the wire harness plate, avoiding the deviation of the neighbor electrode connector during the use of the battery module, thereby improving the reliability of the battery module.

Figure 17:
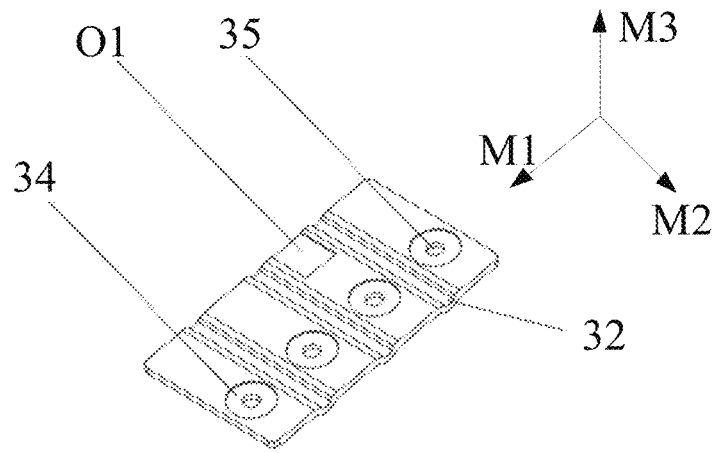
FIG. 17 is a perspective structural diagram of the neighbor electrode connector provided in an embodiment of the disclosure.

Optionally, in the embodiment of the disclosure, as shown in FIG. 12 and FIG. 17, the electrode connector 30 for adjacent connection further includes a through hole 35 and a counterbore 34. The through hole 35 is configured to realize the electrical connection between the electrode connector 30 for adjacent connection and the battery, as well as the positioning of the battery module during assembly. The counterbore 34 is configured to adjust the power of the welding equipment. The thickness of the region where the counterbore 34 is located is less than the thickness of the region (as shown in V4) other than the region where the counterbore 34 is located. In this way, through the arrangement of the through holes, not only the electrical connection between the neighbor electrode connector and the battery can be realized, but also the positioning of the battery module during assembly can be realized to avoid the misalignment between the neighbor electrode connector and the battery, thereby avoiding the misconnection of the batteries. Meanwhile, through the arrangement of the counterbore, the thickness of the region where the counterbore is located can be reduced, so that when assembling by the laser welding equipment, the power requirement of the laser welding equipment is reduced, thereby helping to save energy.

To make one thing clear, optionally, if the thickness of the region (the region shown in V4) other than the region where the counterbore is located is small, the counterbore may not be provided so as to reduce the difficulty of manufacturing the neighbor electrode connector, and improve the manufacturing efficiency.

Optionally, in the embodiment of the disclosure, the maximum thickness of the jumper electrode connector and the neighbor electrode connector can be set to be the same, such as but not limited to 2.5 mm. Certainly, the maximum thickness of the two can also be set to be different, depending on the over-current requirements in the actual situation, so as to satisfy the needs of different application scenarios and improve design flexibility.

Optionally, in the embodiment of the disclosure, the length of the first buffer portion along the arrangement direction of the batteries is the first length, and the length of the second buffer portion along the arrangement direction of the batteries is the second length, and the first length is greater than the second length. For example, as shown in FIG. 12, the arrangement direction of the batteries is the direction M2, the first length of the first buffer portion is represented by h1, the second length of the second buffer portion is represented by h2, and h1 is greater than h2. In this way, because the jumper electrode connector partly surrounds the neighbor electrode connector, the number of batteries that the jumper electrode connector crosses in the direction M2 is relatively large. In order to make sure that the jumper electrode connector can still operate stably and effectively when the batteries being crossed swell, there needs to be a little more structure that can be used for stretching in the direction M2, that is, the first length of the first buffer portion should be larger, so as to ensure the effective operation of the jumper electrode connector and improve the reliability of the battery module.

Figure 18:
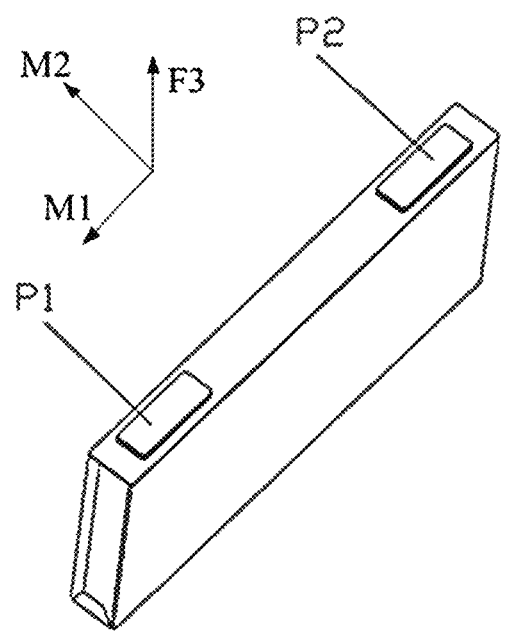
FIG. 18 is a perspective diagram of a battery provided in an embodiment of the disclosure.

Optionally, in the embodiment of the disclosure, as shown in FIG. 4 to FIG. 6, the battery module further includes a flexible circuit board 60 electrically connected to the signal acquisition structure 50. The battery module includes two component regions (such as Q3 and Q4), and an intermediate region Q5 located between the two component regions (such as Q3 and Q4). The battery 20 includes a first electrode terminal P1 and a second electrode terminal P2 (as shown in FIG. 18). The first electrode terminal P1 and the second electrode terminal P2 are respectively located in the two component regions (such as Q3 and Q4), the jumper electrode connector 10 is located in the component region (such as Q3 or Q4), and the flexible circuit board 60 is located in the intermediate region Q5, as shown in combination of FIG. 4 to FIG. 6. In this way, by arranging the flexible circuit board in the intermediate region, even if some parts of the bus element in the component region are abnormal and cause damage to the signal acquisition structure, the damage to the flexible circuit board can be reduced as much as possible. Furthermore, it can be ensured that other signal acquisition structures can effectively transmit the collected signals to the flexible circuit board, thereby minimizing damage and improving the reliability of the battery module.

Optionally, taking a total of 24 batteries as an example, combined with the arrangement position of the bus element shown in FIG. 5, the connection relationship between the 24 batteries can be as shown in FIG. 5, wherein the direction M2 represents the arrangement direction of the batteries, the direction M1 represents the placement direction of the batteries, S1 and S2 represent the total output terminal (or called the input terminal) after the 24 batteries are connected, and the solid line 2 in FIG. 19 indicates the electrical connection relationship between different batteries. In this way, the two output terminals of the battery module can be both on the same side of the battery module, that is, both are in the direction shown by M2 in FIG. 5, which can facilitate wiring, reduce wiring complexity, and decrease wiring length, thereby optimizing the structure of the battery module.

Apparently, those skilled in the art can make various changes and modifications to the disclosure without departing from the spirit and scope of the disclosure. Accordingly, if these modifications and variations of the present disclosure fall within the scope of the claims of the present disclosure and equivalent technologies, the present disclosure is also intended to involve these modifications and variations.

What is claimed is:

1. A battery module, comprising:
    a neighbor electrode connector, a jumper electrode connector, a battery, a wire harness plate, and a signal acquisition structure;
    wherein a number of the battery is greater than or equal to four;
    the neighbor electrode connector is configured to electrically connect a plurality of the batteries arranged adjacent to each other;
    the jumper electrode connector is configured to electrically connect a plurality of the batteries arranged at intervals;
    the jumper electrode connector is provided with a notch in a first direction and toward an outside of the battery module, and the neighbor electrode connector is arranged in the notch;
    the first direction is perpendicular to an arrangement direction of the batteries;
    the wire harness plate is configured between the batteries and the jumper electrode connector;
    a surface, of the jumper electrode connector, close to the wire harness plate is a first surface, and a gap is formed between at least one partial region of the first surface and the wire harness plate;
    the at least one partial region does not contact the wire harness plate;
    the neighbor electrode connector is stably fixed on the wire harness plate;
    the jumper electrode connector comprises:
        two first divisions extending in the first direction, wherein each of the first divisions is electrically connected to the batteries arranged at intervals; and
        a second division electrically connected to the two first divisions, wherein the second division extends in the arrangement direction of the batteries, the second division is disposed between the two first divisions, and the two first divisions and the second division form the notch;
    the gap is formed between the at least one partial region corresponding to the second division in the first surface and the wire harness plate;
    the first surface is directly facing the wire harness plate and the batteries;
    the signal acquisition structure is electrically connected to the jumper electrode connector and the neighbor electrode connector;
    the signal acquisition structure comprises a transmission portion, and the transmission portion passes through the gap;
    the jumper electrode connector is provided with a first buffer portion in a bent shape, and the first buffer portion is stretchingly deformed or contractingly deformed along the arrangement direction of the batteries under an action of an external force;
    the transmission portion is arranged in the first buffer portion;
    the signal acquisition structure further comprises a collection portion electrically connected to the transmission portion;
    the collection portion comprises a first collection terminal, a second collection terminal and a buffer structure connected to the first collection terminal and the second collection terminal;
    the first collection terminal is electrically connected to the jumper electrode connector;
    the second collection terminal is electrically connected to the neighbor electrode connector; and
    the buffer structure is stretchingly deformed or contractingly deformed along the arrangement direction of the batteries under the action of the external force.

2. The battery module according to claim 1, wherein an insulation enhancement structure is provided between the transmission portion and the jumper electrode connector; or the gap is formed between the transmission portion and the jumper electrode connector.

3. The battery module according to claim 1, wherein the wire harness plate is arranged between the batteries and the neighbor electrode connector, and a first slot is provided on a side of the neighbor electrode connector away from the wire harness plate;
    wherein the first collection terminal is electrically connected to the jumper electrode connector at the first buffer portion; and
    the second collection terminal is electrically connected to the neighbor electrode connector at the first slot.

4. The battery module according to claim 1, wherein the wire harness plate is arranged between the batteries and the jumper electrode connector;
    wherein the wire harness plate comprises a frame and at least one first buckle;
    the first buckle is located on a side of the jumper electrode connector away from the batteries; and
    the frame is located on a side of the jumper electrode connector close to the batteries, and the frame is configured to support the jumper electrode connector.

5. The battery module according to claim 4, wherein a first buffer portion in a bent shape is provided on the jumper electrode connector, and the first buckle is provided corresponding to the first buffer portion; and/or
    the jumper electrode connector has a second slot on a side away from the batteries, and the first buckle is arranged corresponding to the second slot.

6. The battery module according to claim 4, wherein a second buffer portion in a bent shape is provided on the neighbor electrode connector, and the second buffer portion is stretchingly deformed or contractingly deformed along the arrangement direction of the batteries under the action of the external force;
    the wire harness plate is further arranged between the batteries and the neighbor electrode connector;

the wire harness plate further comprises at least one second buckle and at least one third buckle;

the second buckle is located on a side of the neighbor electrode connector away from the batteries, and the second buckle is provided corresponding to the second buffer portion; and the third buckle is located on a side of the neighbor electrode connector close to the batteries, and the third buckle is provided corresponding to the second buffer portion.

* * * * *